United States Patent [19]

Pleiss, Jr. et al.

[11] 3,842,297

[45] Oct. 15, 1974

[54] RECEPTACLE FOR SECURING A SENSING ELEMENT WITHIN ELECTRICAL WINDINGS

[75] Inventors: Bernard J. Pleiss, Jr., Dayton; Theodore J. Surmacz, Troy, both of Ohio

[73] Assignee: A. O. Smith Corporation, Milwaukee, Wis.

[22] Filed: Mar. 1, 1973

[21] Appl. No.: 337,074

Related U.S. Application Data

[63] Continuation-in-part of Ser. No. 241,775, April 6, 1972, abandoned.

[52] U.S. Cl. .............. 310/68 C, 310/71, 174/138 F
[51] Int. Cl. ........................................... H02k 11/00
[58] Field of Search............ 310/68 R, 68 C, 67, 71

[56] References Cited
UNITED STATES PATENTS

| | | | |
|---|---|---|---|
| 3,131,322 | 4/1964 | Pleiss, Jr. et al. .................. | 310/68 C |
| 3,246,183 | 4/1966 | Slonneger ......................... | 310/68 R |
| 3,515,917 | 6/1970 | Kolb ................................... | 310/71 |

Primary Examiner—J. D. Miller
Assistant Examiner—Robert J. Hickey
Attorney, Agent, or Firm—Andrus, Sceales, Starke & Sawall

[57] ABSTRACT

A receptacle adapted for insertion within electrical windings to secure a sensing element includes a sheet-like flexible material adapted to be centrally folded for providing first and second laterally extending portions. The first portion includes a tab having a pair of spaced openings each adapted to receive the sensing element and includes an outer portion adapted to be folded upon an intermediate portion while the intermediate portion is adapted to be folded and positioned opposite to the second portion with the outer portion positioned opposite to an inner portion so that the pair of spaced openings are aligned to receive the sensing element. The second portion includes a tab which secures the receptable positioned sensing element through the envelopment of a sensing element male terminal by one of a plurality of tab openings with the envelopment further secured through the connection of an external electrical lead having a female terminal to the sensing element male terminal. An alternative embodiment provides a latching tab which extends from the first portion and passes through one of the spaced openings and provides an outer laterally offset extension having an opening for receiving and securing the outer end of the sensing element.

14 Claims, 9 Drawing Figures

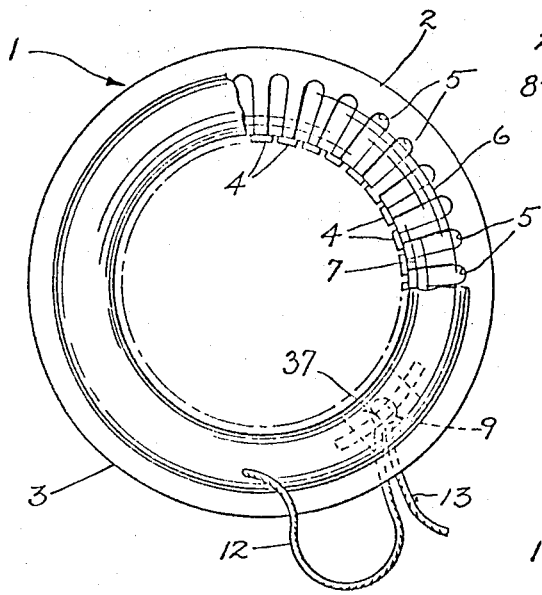
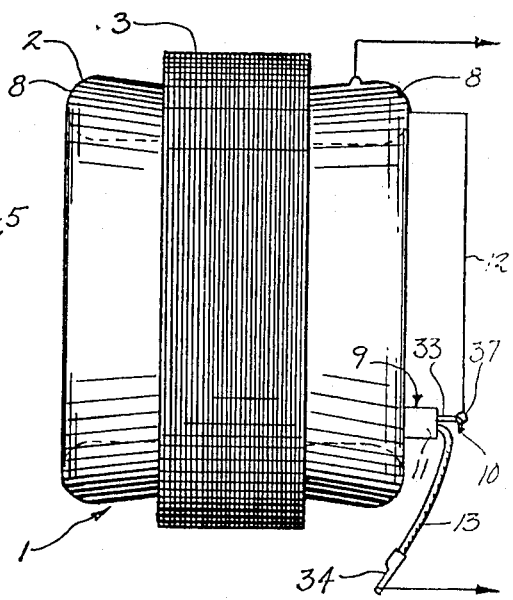
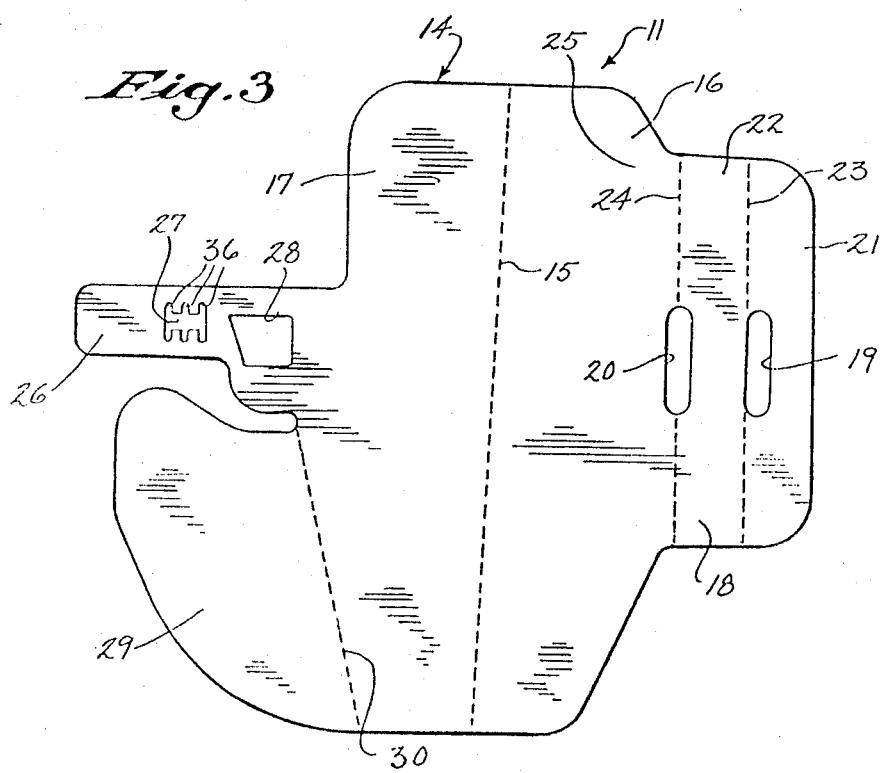

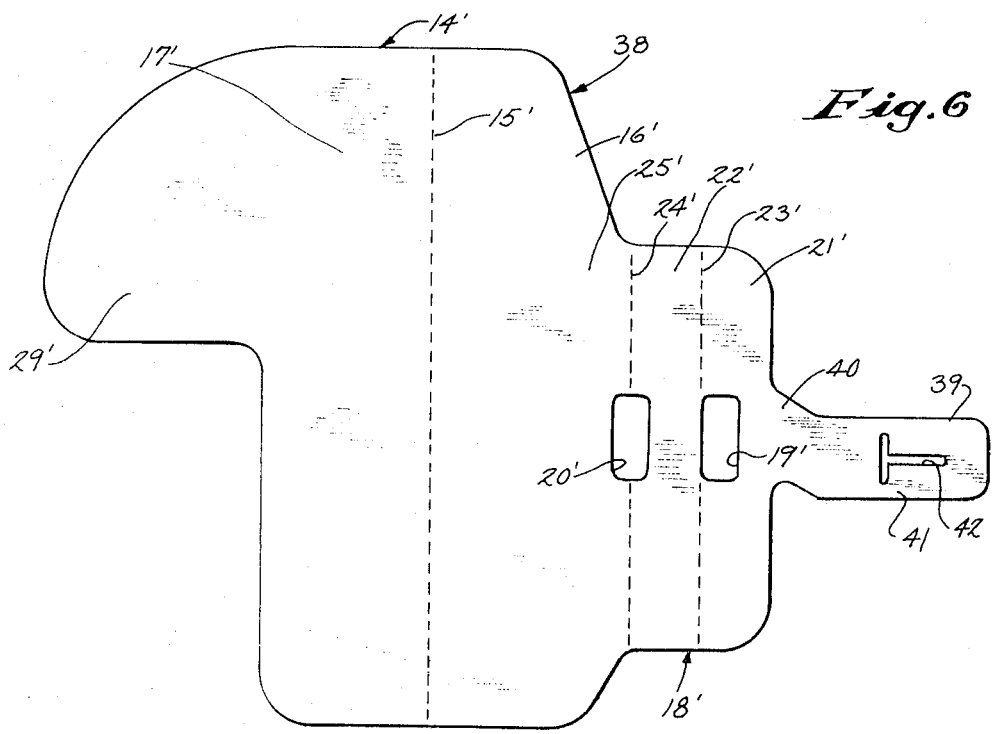
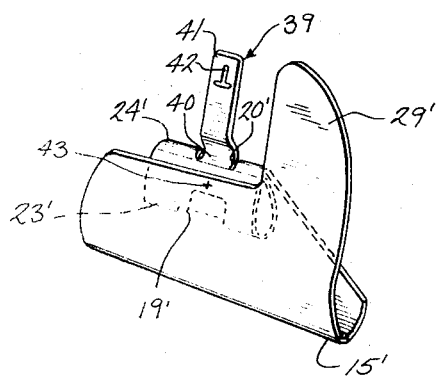
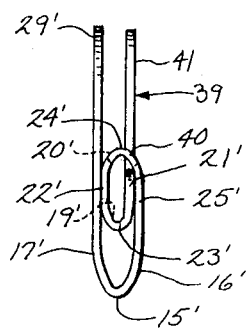
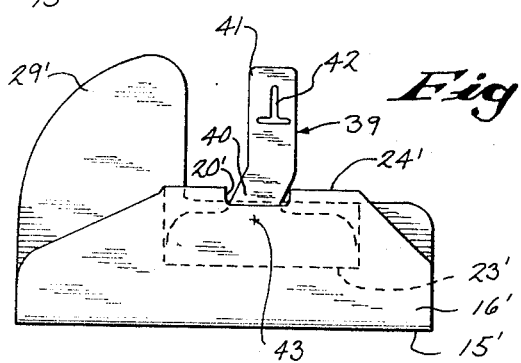

RECEPTACLE FOR SECURING A SENSING ELEMENT WITHIN ELECTRICAL WINDINGS

BACKGROUND OF THE INVENTION

This invention relates to a receptacle adapted for insertion within an electrical winding to secure a sensing element. This application is a continuation-in-part of the co-pending U.S. Pat. application Ser. No. 241,775, now abandoned filed on Apr. 6, 1972 by B. Pleiss and T. Surmacz entitled "Receptacle for Securing a Sensing Element with Electrical Windings," and assigned to a common assignee.

Receptacles adapted to removably secure sensing elements have been inserted within windings of an electric motor to facilitate easy placement and removal of such sensing elements without altering or damaging the motor windings and associated structure.

One known receptacle has been provided for insertion between end turns of electric motor windings to position an overload protector for sensing the thermal properties of the operating motor, as shown in the U.S. Pat. No. 3,131,322 issued on Apr. 28, 1964. Such a receptacle provided a substantially V-shaped insulation portion which telescoped over a complementary substantially V-shaped metal foil-like portion which together formed a substantially centrally located pocket-like recess adapted to receive the overload protector.

SUMMARY OF THE INVENTION

This invention relates to a receptacle adapted for insertion within an electrical winding to secure a sensing element.

A sheet-like flexible material is adapted to be centrally folded for providing first and second laterally extending portions. The first portion includes a first tab having a pair of spaced openings each adapted to receive the sensing element. The first tab provides an outer portion which is adapted to be folded upon an intermediate portion. The intermediate portion, in turn, is adapted to be folded and positioned opposite to the second portion with the outer portion positioned opposite to an inner portion of the first tab so that the pair of spaced openings are aligned to receive a sensing element.

In one form of the invention, the second portion includes a second tab having an opening and is adapted to be pulled over and secured to the receptacle positioned sensing element through the envelope of a projection on the sensing element by the tab opening.

In another form of the invention, a latching tab forms an extension of the first portion and is positioned to pass through one of the spaced opening and further provides an opening to receive the outer end of the sensing element to latch the element within the receptacle. In a preferred form, the latching tab includes a first extension which passes through one of the spaced openings and a second extension extending outwardly from the first extension and offset laterally therefrom. The offset second extension thus provides an opening which is offset laterally from the pair of spaced openings thus permitting the selected envelopment of one of several output terminals projecting from the sensing element.

The first and second portions of the receptacle are preferably secured together in a folded position thereby enveloping the sensing element. In one form of the invention, the second securing tab formed as a part of the second portion is effective for securing the first and second portions in an assembled position by the envelopment of the sensing element. In the form of the invention providing a latching tab as an extension of the first portion, the first and second portions may be secured together by the pressure exerted by the windings but are preferably secured by ultrasonic welds which bind the first and second portions together.

The projection on the sensing element may take the form of a male electrical terminal in a preferred form of the invention. Thus, an electrical lead, such as connected to the electrical windings, is provided with an electrical female connector and is connected to the male terminal of the sensing element for securing the second portion tab or the latching tab to the sensing element. Also, a second opening in the second tab is provided for viewing indicia located upon the sensing element without having to remove such element from the receptacle. The second portion of the receptacle also includes a third tab which is adapted to be folded over the electrical windings to further insulate the electrical leads from the windings.

The inventors have found that a laminate formed by layers of Dacron and Mylar is highly desirable for use as a sheet-like flexible material for electrically insulating the sensing element from the electrical windings in accordance with the invention.

It is contemplated that the receptacle can be utilized in accordance with the invention with either only a first tab or only a second tab.

The invention thus provides a highly desirable receptacle which is economically fabricated and adapted for easy insertion within electrical windings to easily and removably secure a sensing element.

BRIEF DESCRIPTION OF THE DRAWING

The drawing furnished herewith illustrates the best mode presently contemplated by the inventors and clearly discloses the above advantages and features as well as others which will be readily understood from the detailed description thereof.

In the drawings:

FIG. 1 is an end view of a dynamoelectric machine illustrating the employment of a receptacle and sensing element;

FIG. 2 is a side view of the dynamoelectric machine shown in FIG. 1;

FIG. 3 is a developed view of the receptacle illustrated in FIGS. 1 and 2;

FIG. 6 is a developed view of an alternative receptacle which may be utilized as illustrated in FIGS. 1 and 2;

FIG. 7 is a perspective view illustrating the folded construction of the receptacle shown in FIG. 6;

FIG. 8 is an elevational view showing the folded construction of the receptacle of FIG. 6; and FIG. 9 is an end view showing the folded construction of the receptacle of FIG. 6.

DESCRIPTION OF THE PREFERRED ILLUSTRATED EMBODIMENT

Figure 4:
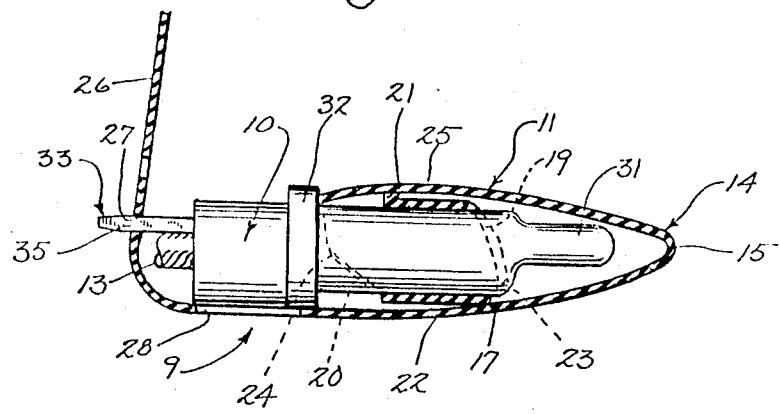
FIG. 4 is a sectional view taken along the central portion of the folded receptacle.

Referring to the drawings and particularly FIG. 1, the illustrated embodiment of the invention includes a dynamoelectric machine 1 having a stator and coil assembly 2 constructed in a conventional manner well known to those skilled in the art. Specifically, a magnetic stator core 3 provides integral teeth 4 which define slots 5 into which a main winding 6 and a phase winding 7 are fitted in a well known manner. The insulated stator windings 6 and 7 are energized in a well known manner and further discussion thereof is deemed unnecessary.

The stator windings 6 and 7 provide end turns 8 on opposite sides of the magnetic core 3 which are suitably secured in place with respect to the stator core 3, such as through tie cords or the like.

An overload sensing apparatus 9 is generally centrally secured between the end turns 8 of the stator windings 6 and 7 and includes an overload sensing element 10 and a receptacle 11. The sensing element 10 is illustrated as a well known overload protector, such as a snap-action or a bi-metal electrical switch, which opens the circuit in response to an abnormal motor operating condition. A first lead 12 is connected as a part of the stator windings and is adapted to be removably connected to the sensing element 10 by means of terminal 37 while a second lead 13 is connected to the sensing element 10 and to a motor energizing power source (not shown). The overload sensing element 10 thus selectively completes an electrical circuit between the windings and an energizing power source and disconnects the circuit and ceases motor operation when abnormal sensed operating conditions exist.

With reference to FIG. 3, the receptacle 11 is shown in a developed view and consists of a sheet-like flexible material 14 having good electrical insulating characteristics, such as provided by a laminate formed by layers of Dacron and Mylar.

In accordance with the invention as illustrated in FIGS. 3 and 4, the sheet-like flexible material 14 is adapted to be folded at a central fold line 15 for providing a first portion 16 and a second portion 17 which laterally extend with respect to each other. The first portion 16 includes a first tab 18 having a pair of spaced openings 19 and 20 which are each adapted to receive the sensing element 10.

The first tab 18 further provides an outer portion 21 which is adapted to be folded upon an intermediate portion 22 such as at a fold line 23. The intermediate portion 22, in turn, is adapted to be folded at a fold line 24 so as to be positioned opposite to the second portion 17 with the outer portion 21 positioned opposite to an inner portion 25. The first tab 18 is therefore adapted to be folded at the fold lines 23 and 24 so that the pair of spaced openings 19 and 20 are aligned to receive the sensing element 10. Specifically, the openings 19 and 20 are formed as parallel orientated longitudinal slots along fold lines 23 and 24, respectively, and are separated by an appropriate distance to securely hold the sensing element 10.

The second portion 17 of the sheet-like flexible material 14 provides a second tab 26 having an opening 27 which is adapted to be pulled over and secured to the receptacle positioned sensing element 10, as will be further discussed hereinafter.

The second tab 26 further provides a second opening 28 which is adapted to provide a viewing window to read indicia located upon the sensing element 10 thereby eliminating the need to remove the sensing element 10 from the receptacle 11 in order to obtain the sensing element designation or serial number.

The second portion 17 further provides a third tab 29 which is adapted to be folded, such as at fold line 30 to further insulate the stator leads from the electrical windings.

Figure 5:
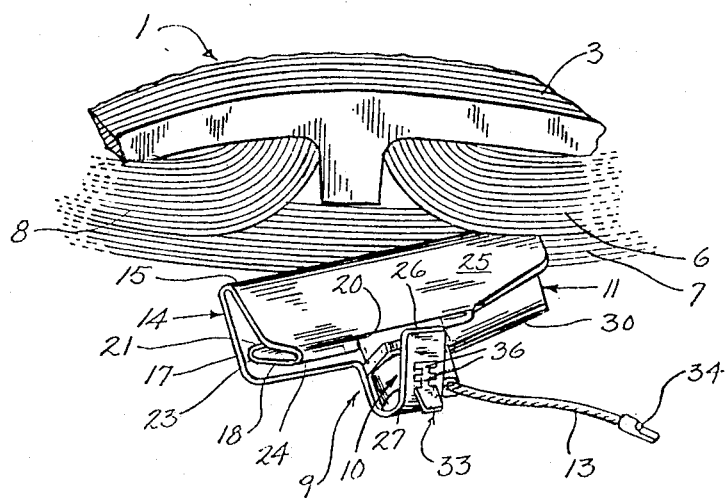
FIG. 5 is a perspective view illustrating the employment of the receptacle and sensing element with the end turns of a motor winding.

With reference to FIG. 5, the stator core 3 is shown in fragmentary view to illustrate the application of the receptacle 11 to the stator windings 6 and 7. Specifically, the end turns 8 are separated during the fabrication process and the receptacle 11 is inserted so that fold line 24 is approximately adjacent to the outermost end turn winding.

During fabrication, a dummy sensing element is inserted into the pair of spaced openings 19 and 20 and the receptacle containing the dummy is inserted into the end turns 8 of the windings 6 and 7. A suitable insulating coating, such as varnish or the like, is added to the end turns 8 and cured such as by baking after which the dummy sensing element is removed. The receptacle 11 thus provides a pair of spaced openings 19 and 20 which are adapted to readily receive the sensing element 10.

The sensing element 10 is illustrated as having a wedged shaped body portion 31 which is adapted for easy insertion into the pair of spaced openings 19 and 20 in the receptacle 11. In addition, the sensing element 10 provides a terminal mount 32 connected to the upper portion of the body portion 31 and has an outwardly extending projection shown as an electrical male terminal 33 and the electrical lead 13 which terminates in an electrical terminal 34.

When the receptacle 11 is utilized, the second tab 26 is adapted to be pulled over the sensing element 10 when positiond within the pair of spaced openings 19 and 20 thereby allowing the opening 27 to envelop the electrical male terminal 33. Specifically, the male terminal 33 provides a spade-shaped prong 35 while the opening 27 includes a plurality of spade-shaped openings 36 each adapted to receive the prong 35 for adjustably securing the sensing element 10 within the receptacle 11. The removable connection of a female terminal 37 provided by the lead 12 to the electrical terminal 33 thus removably secures the second tab 26 to the sensing element 10 and prevents the latter from accidentally disengaging from the receptacle during motor operation. It is contemplated although not illustrated that the second tab 26 may alternatively be removably secured to the sensing element 10 through a coupling of a male terminal provided by the lead 12 to a female receptacle or terminal provided by the sensing element 10 with the male terminal being enveloped by one of the plurality of spade-shaped openings 36 of tab 26. The second tab 26 therefore insures that the overload sensing element 10 remains in secured engagement within the pair of spaced openings 19 and 20 and in secured position within the end turns 8 of the electric motor 1.

The third tab 29 of the second portion 17 is adapted to be folded at fold line 30 over a portion of the end turns 8 to further insulate the stator leads from the windings.

The preferred embodiment has illustrated the use of the receptacle 11 as applied to the end turns 8 of the stator windings 6 and 7 for an electric motor 1. It is understood, however, that applicants' invention can be conveniently utilized with any electrical type of windings to secure any type of sensing element thereto. It is further understood that a receptacle may be provided in accordance with the invention having only the first tab 18 or only the second tab 26, although the preferred form of the invention utilizes both tabs 18 and 26 which cooperate to ensure secured engagement of the sensing element 10 within the windings 6 and 7.

Another form of the receptacle is illustrated in FIGS. 6–9 and designated as receptacle 38 which may also be utilized to secure an overload sensing element 10 within the end turns 8 of the stator windings 6 and 7 as illustrated in FIGS. 1 and 2. The elements of receptacle 38 which are similar to the elements of receptacle 11 have been designated by identical numbers primed and further discussion thereof is deemed unnecessary.

The receptacle 38 is constructed to provide a latching tab 39 as an extension of the first portion 16'. Specifically, the latching tab 39 is connected as an extension of the outer portion 21' and includes a first extension 40 and a second extension 41. The second extension 41 is constructed to be laterally offset from the first extension 40 and includes a T-shaped slot or opening 42.

When in a folded position as illustrated in FIGS. 7–9, the latching tab 39 is positioned to pass through the opening 20' so that the first extension 40 is positioned within opening 20' and the second extension 41 extends outward therefrom and laterally offset from the first extension 40.

In order to secure the first portion 16' to the second portion 17' to maintain the receptacle 38 in a folded position, one or more ultrasonic spot welds 43 may be employed to bond the fibers of flexible material 14' together.

As the receptacle 38 is employed within the stator windings 6 and 7, the sensing element 10 is inserted within the pair of spaced openings 19' and 20' in the same manner as described with respect to the receptacle 11. The securing tab 39 is thereafter folded over the sensing element 10 and envelops the male terminal 33 by the opening 42. The tab 39 is thus effective for securing the sensing element 10 within the pair of spaced openings 19' and 20' of the receptacle 38 and thus in secured position within the end turns 8 of the electric motor 1.

The present invention therefore provides a highly desirable and economical receptacle for use with electrical windings to secure a sensing element thereto.

Various modes of carrying out the invention are contemplated as being within the scope of the following claims particularly pointing out and distinctly claiming the subject matter which is regarded as the invention.

We claim:

1. In a receptacle adapted for insertion within electrical windings to secure a sensing element therein and insulate the element from the windings, comprising a sheet-like flexible material disposed in a folded position to provide oppositely located first and second portions laterally extending with respect to each other, said first portion including first and second spaced folds adjacent the outer end thereof and a pair of spaced openings each adapted to receive the sensing element, said first and second folds defining an outer portion, an intermediate portion, and an inner portion with said outer portion folded at said first fold upon said intermediate portion, said intermediate portion folded at said second fold and positioned opposite to said second portion with said outer portion positioned opposite to said inner portion of said first portion so that the pair of spaced openings becomes aligned to receive the sensing element.

2. The receptacle of claim 1, and including a latching tab forming an extension of said outer portion of said first portion positioned to pass through one of said spaced openings and having an opening therein to receive the outer end of the sensing element and latch the element within the receptacle.

3. A receptacle adapted for insertion within electrical windings to secure a sensing element therein and insulate the element from the windings, comprising a sheet-like flexible material disposed in a folded position to provide oppositely located first and second portions extending laterally with respect to each other, said first portion having at least a pair of spaced folds adjacent the outer end thereof and a pair of spaced openings extending generally parallel to said folds and in substantially the same plane to receive the sensing element in said openings, and means securing the first and second portions of the receptacle in the folded position enveloping said sensing element.

4. The receptacle of claim 3, wherein said securing means includes an ultrasonic weld between said first and second portions.

5. The receptacle of claim 3, and including a latching tab forming an extension of said first portion positioned to pass through one of said spaced openings and having an opening therein to receive the outer end of the sensing element and latch the element within the receptacle.

6. The receptacle of claim 5, wherein said latching tab includes a first extension passing through one of said spaced openings and a second extension extending outwardly from said first extension and offset laterally therefrom.

7. The receptacle of claim 3, wherein said sheetlike flexible material consists of an electrical insulating laminate formed by layers of Dacron and Mylar.

8. The receptacle of claim 3, wherein said tab provides a second opening for viewing indicia located on the sensing element.

9. The receptacle of claim 3, in which the second portion of the receptacle extending outwardly from the first portion includes a tab overlying the first portion of the receptacle and having a plurality of spaced openings to selectively receive the outer end of the sensing element in at least one of said spaced openings for latching the element within the receptacle.

10. The receptacle of claim 3, and said means including an extension of the second portion of the receptacle outwardly of the first portion and having an opening therein to receive the outer end of the sensing element and latch the element within the receptacle.

11. The receptacle of claim 10, in which the second portion of the receptacle extending outwardly from the first portion includes a tab overlying the first portion of the receptacle and having a plurality of spaced openings to selectively receive the outer end of the sensing element in at least one of said spaced openings for latching the element within the receptacle.

12. In a receptacle adapted for insertion within electrical windings to secure a sensing element having a projection therein and insulate the element from the windings, comprising a sheet-like flexible material folded for providing first and second portions laterally extending with respect to each other, said first portion including a first tab having at least first and second spaced folds adjacent the outer end thereof and a pair of spaced openings each adapted to receive the sensing element, said first tab having an outer portion, an intermediate portion and an inner portion with said outer portion folded at said first fold upon said intermediate portion, said intermediate portion folded at said second fold and positioned opposite to said second portion with said outer portion positioned opposite to said inner portion of said first tab so that the pair of spaced openings becomes aligned to receive the sensing element, said second portion including a second tab having an opening to receive the outer end of the receptacle positioned sensing element and latch the element within the receptacle.

13. The receptacle of claim 12, wherein said second portion includes a third fold providing a third tab positioned over the electrical windings.

14. The receptacle of claim 12, wherein said projection includes an electrical male terminal and including an electrical lead electrically connected as a part of the electrical windings and providing an electrical female terminal adapted to be removably connected to the male terminal of the sensing element for securing said tab to the sensing element.

* * * * *

UNITED STATES PATENT OFFICE
CERTIFICATE OF CORRECTION

Patent No. 3,842,297  Dated October 15, 1974

Inventor(s) Bernard J. Pleiss, Jr. and Theodore J. Surmacz

It is certified that error appears in the above-identified patent and that said Letters Patent are hereby corrected as shown below:

Column 1, line 51, Cancel "envelope" and substitute therefor ---envelopment---

Signed and sealed this 22nd day of April 1975.

(SEAL)
Attest:

RUTH C. MASON
Attesting Officer

C. MARSHALL DANN
Commissioner of Patents
and Trademarks